United States Patent [19]
Beeson et al.

[11] Patent Number: 6,038,438
[45] Date of Patent: Mar. 14, 2000

[54] EMERGENCY RADIO BEACON CAPABLE MOBILE COMMUNICATION SYSTEM MOBILE TELEPHONE AND METHOD

[75] Inventors: Steve Beeson, Burgess Hill, United Kingdom; Eric Valentine, Plano, Tex.

[73] Assignee: Ericsson, Inc., Reasearch Triangle Park, N.C.

[21] Appl. No.: 09/001,028

[22] Filed: Dec. 30, 1997

[51] Int. Cl.[7] .................................................. G01S 3/02
[52] U.S. Cl. ......................... 455/404; 455/414; 455/456
[58] Field of Search ................................... 455/404, 414, 455/456, 466

[56] References Cited

U.S. PATENT DOCUMENTS

| | | | |
|---|---|---|---|
| 5,563,931 | 10/1996 | Bishop et al. | 455/404 |
| 5,689,548 | 11/1997 | Maupin et al. | 455/404 |
| 5,732,125 | 3/1998 | Oyama | 455/404 |
| 5,740,532 | 4/1998 | Fernandez et al. | 455/404 |
| 5,742,666 | 4/1998 | Alpert | 455/404 |
| 5,764,188 | 6/1998 | Ghosh et al. | 455/456 |
| 5,797,093 | 8/1998 | Houde | 455/404 |
| 5,835,907 | 11/1998 | Newman | 455/456 |

*Primary Examiner*—Edward F. Urban
*Assistant Examiner*—Thuan T. Nguyen

[57] ABSTRACT

A mobile communication system with a plurality of mobile telephones including an emergency radio beacon transmitting mobile telephone with an emergency radio beacon transmitter that is selectively activated in response to receipt from a coded emergency beacon activation signal from a beacon activating emergency center. The emergency beacon activating center determines whether an emergency call is from an emergency beacon capable mobile telephone based on receipt of the call on a dedicated emergency beacon capable trunk. Alternatively, the determination is based on a suffix number added to the emergency center number by an MSC/VLR switch prior to connection to the emergency center or is based on an emergency beacon capable indicating code added to the calling party's number. The beacon activation signal is one of a supplementary service data signal, a short message service signal and a control A-interface signal transmitted from a base radio transceiver which is coded for a particular telephone desire to be activated.

26 Claims, 6 Drawing Sheets

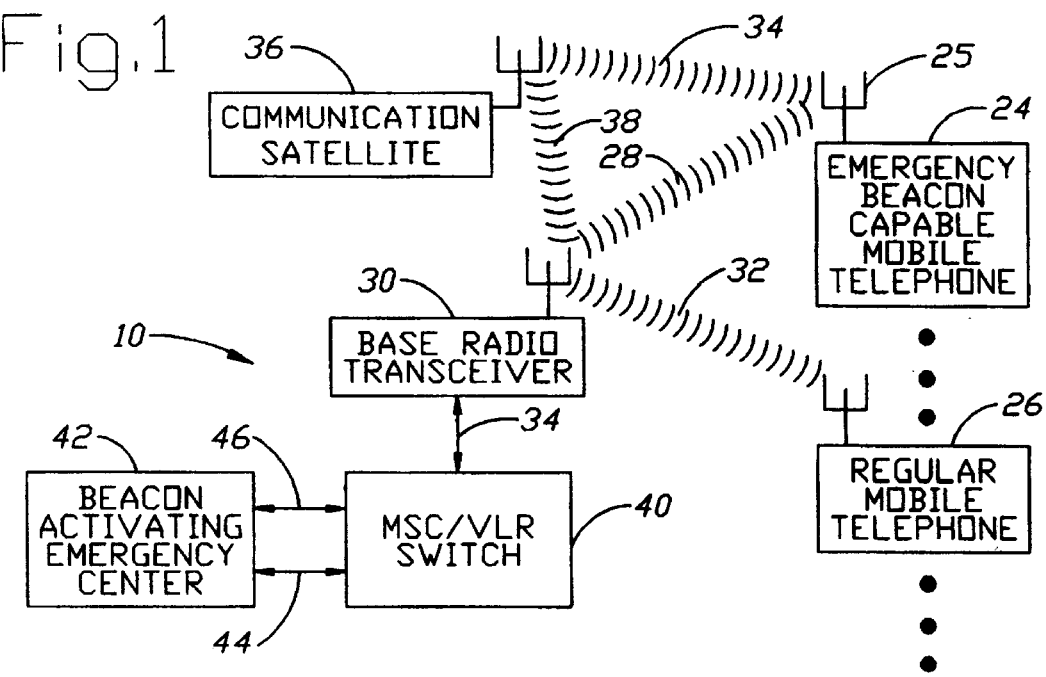
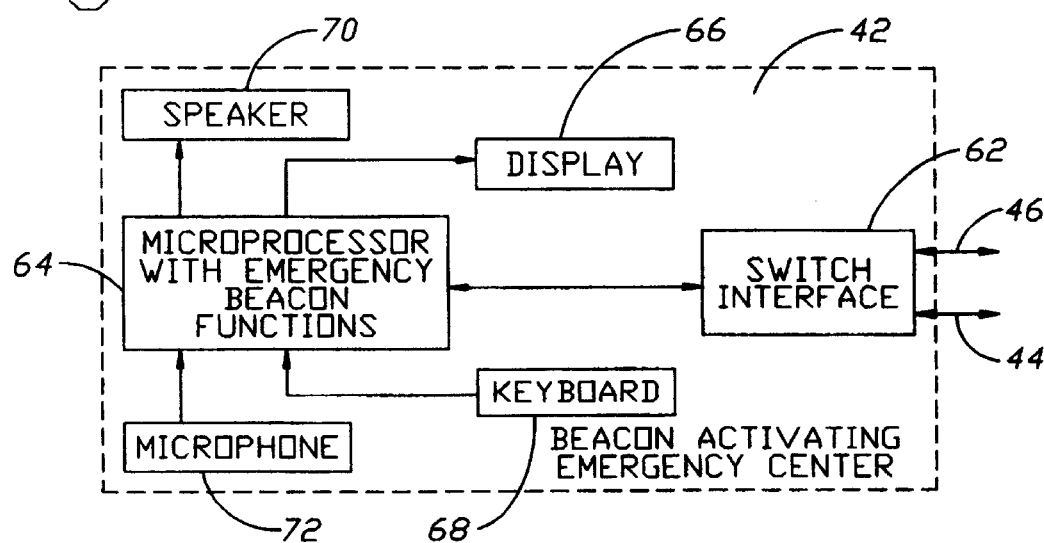

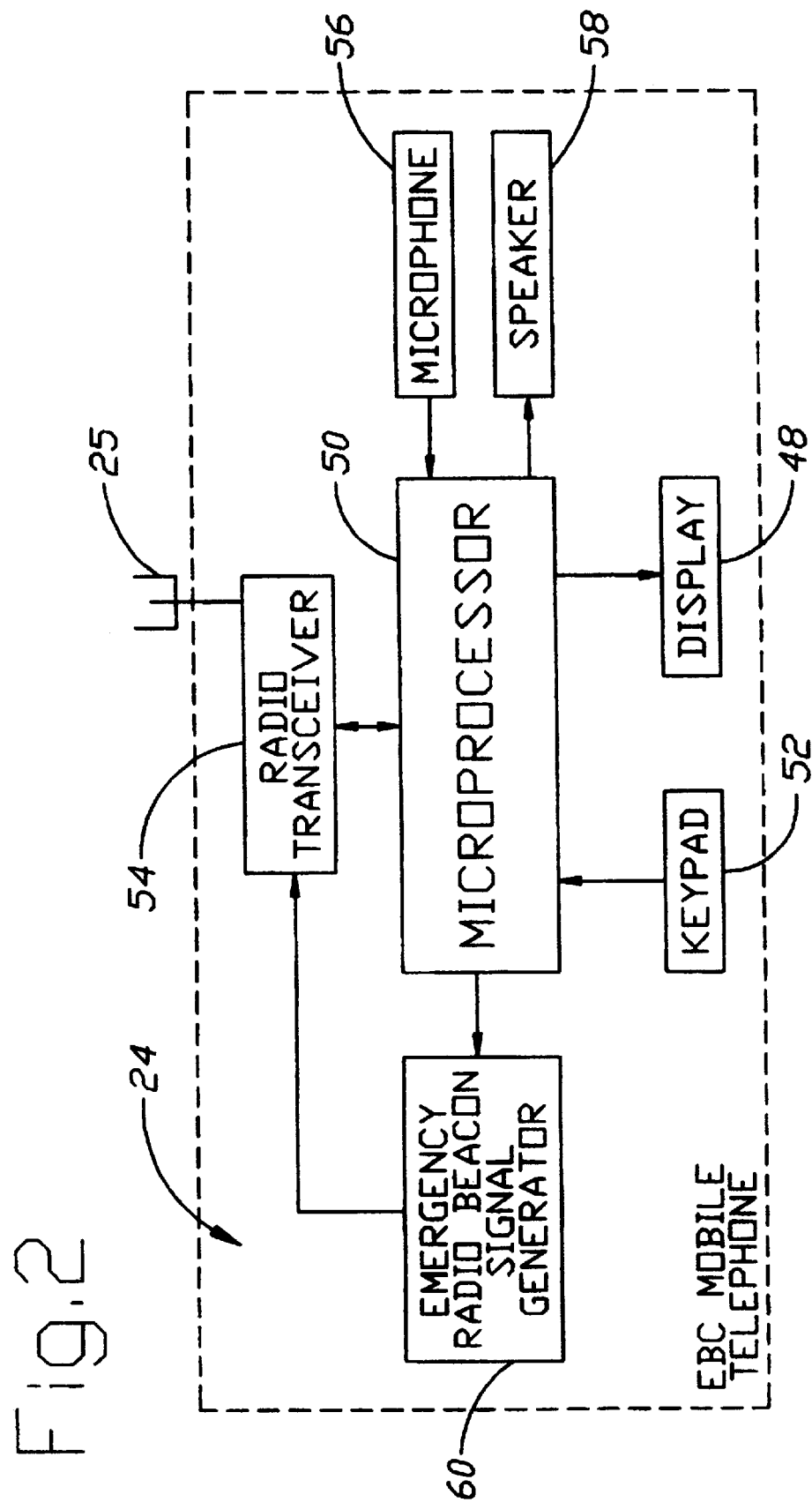

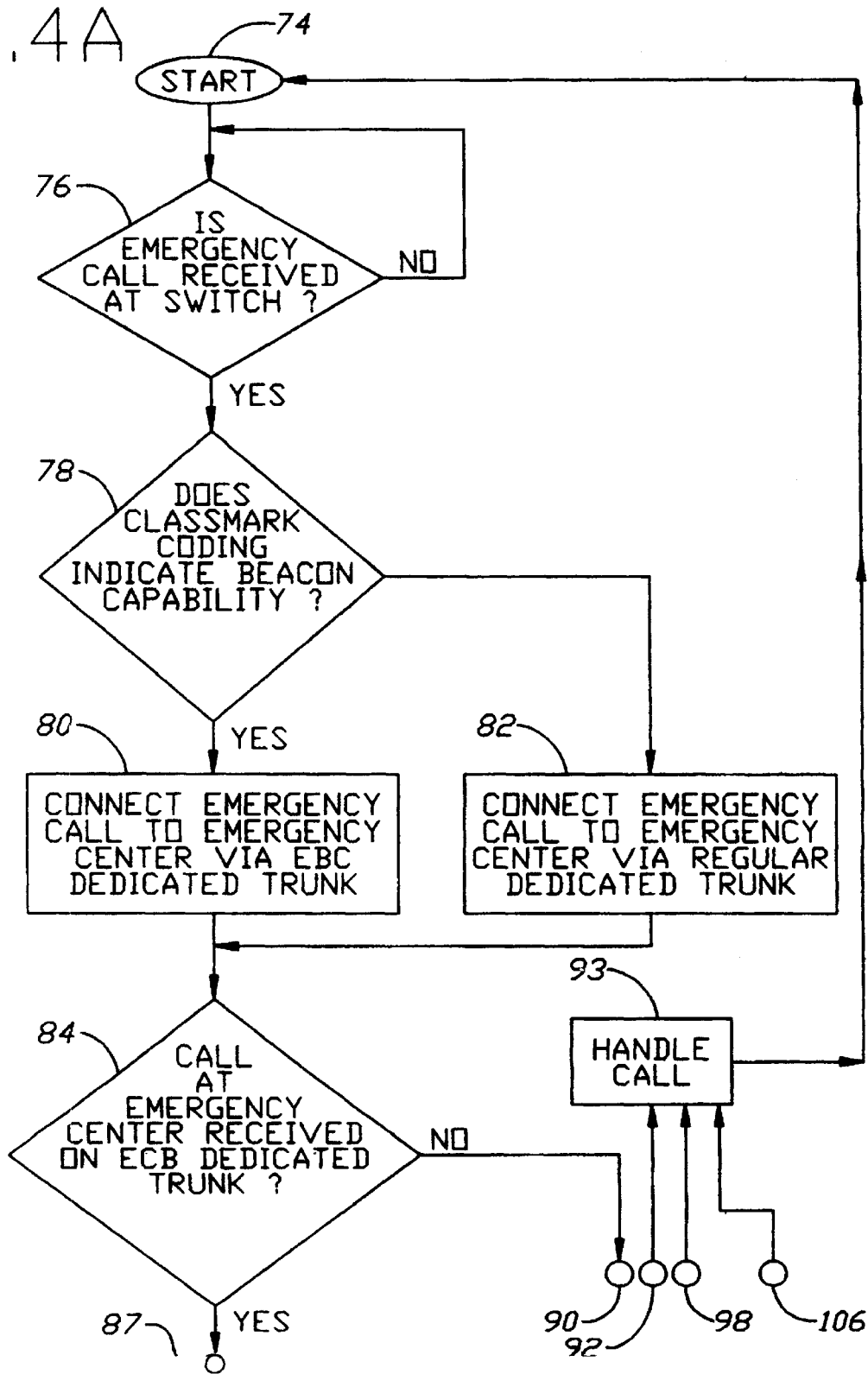

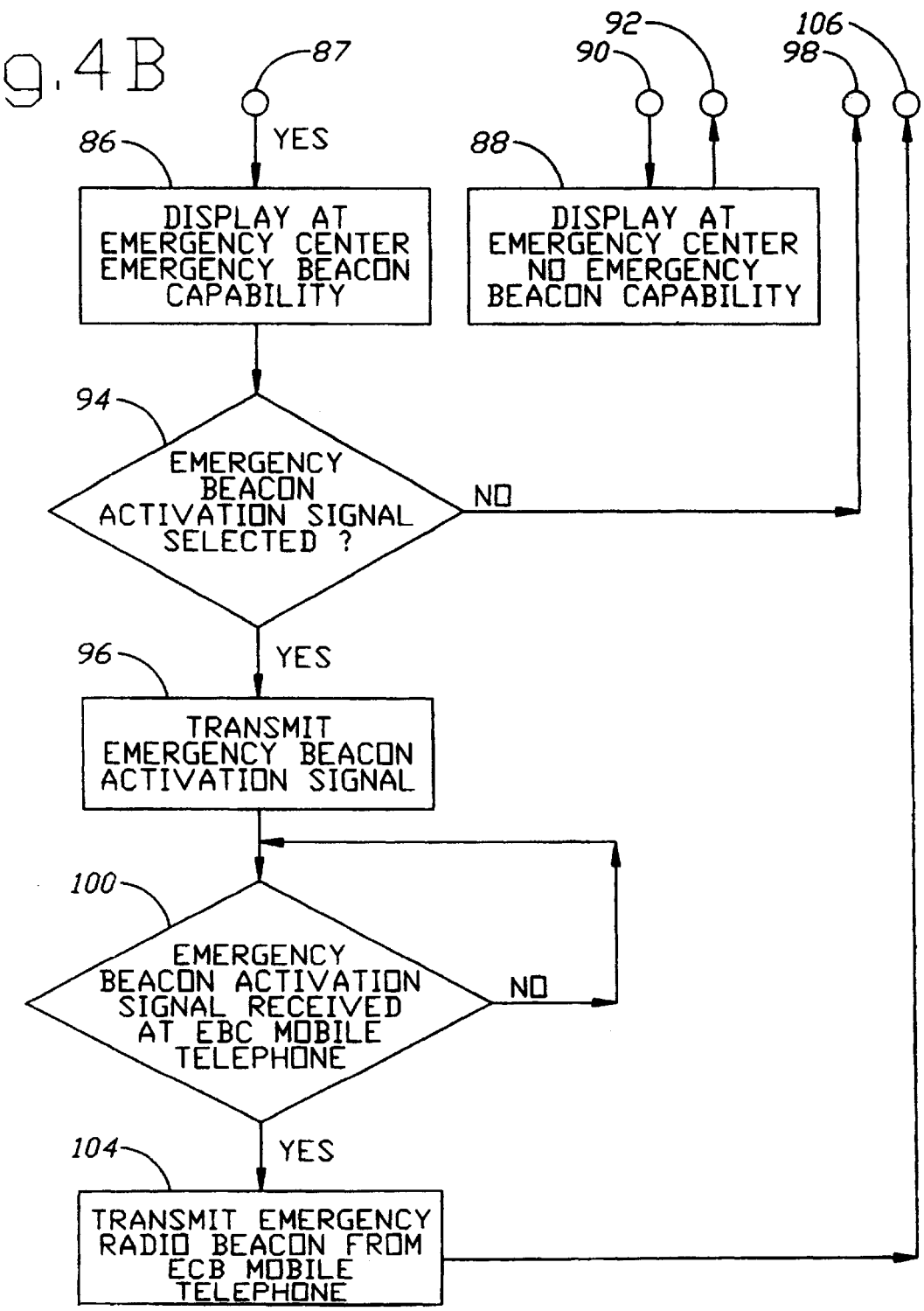

EMERGENCY RADIO BEACON CAPABLE MOBILE COMMUNICATION SYSTEM MOBILE TELEPHONE AND METHOD

BACKGROUND OF THE INVENTION

This invention generally relates to a mobile telephone communication system and more particularly to such a system with facilities for handling emergency calls.

Apparatus and methods have been previously proposed for determining the location of a mobile telephone upon receipt of an emergency call from the mobile telephone and otherwise.

A difficulty with these systems is that they require a modification of the infrastructure of the communication network within which they operate. Also, some of the proposed locating system will not work with both satellite communication systems and terrestrial based cellular communication networks. Moreover, these systems disadvantageously require rescue personnel to be located at the emergency center to receive the positional information which may or may not be accurate.

There is currently a system used widely by hunters, the merchant marine and boaters which makes use of emergency radio beacons broadcast on an internationally agreed channel. While this beacon system allows tracking of, for instance, a boater in distress, it is not integrated with an emergency call handling system or mobile telephone. Also, the emergency beacon transmission is initiated from the remote radio transmitter which can result in inadvertent actuation when, in fact, there is no emergency. There have been cases where accidental activation of the beacon has resulted in wasteful and unneeded searches.

COSPAS-SARSAT is an international satellite system for Search and Rescue. It consists of a constellation of four satellites in polar orbit and a network of earth stations which provide distress alert and location information to appropriate rescue authorities anywhere in the world, for maritime, aviation and land users in distress. In addition, the U.S., French, Canadian and other governments provide two geostationary satellites over North America. The frequencies used include 121.5 MHz, 243 MHz and 406.5 MHz.

ICO Global Communications is providing a global mobile satellite system which uses a system of satellites to communicate with the user handsets. Other mobile satellite systems include those of Irridium and Globalstar. In addition, there are a number of regional satellite systems which make use of one or more geosynchronous satellites. The system from ICO Global Communications uses a Time Division Multiple Access (TDMA) air interface and a Global System for Mobile Communication (GSM) network architecture.

In the ICO Global Communications network, it is possible to place emergency calls as would be done in a normal cellular network. One difference is that determining the position of the user in distress is problematic due to the large coverage area and position determination techniques. Generally, when a subscriber places an emergency call, a call is set up to an emergency answering center.

A number of techniques are known for delivering "cell" or service area information to an emergency center. However, in one case, a calling party number field is populated with the cell identity. In the case of the ICO Global Communication network, a service area can as large as an entire country. There is currently no means to transfer actual positional information from the mobile unit within the service area or cell to the emergency center, only the cell or service area itself can be transferred.

However, it has been proposed to have the mobile unit send a set of coordinates to the emergency center. The accuracy of these coordinates, in the theoretical case that they could be delivered, are dependent on the accuracy of the information used to perform the position calculation. In the case where the position is calculated using the Global Positioning System, the coordinates are quite accurate indeed. However, in the case where the coordinates are calculated based on delay or power measurements, the accuracy can vary depending on a number of factors, including the distance from the center of the satellite spot beam. Inaccuracy in positioning location on the order of scores of kilometers based on radio measurements are possibly introduced.

In either case, position updates are not available during the course of a call, but are only available when communication between the terminal and the network is first established.

SUMMARY OF THE INVENTION

In accordance with the present invention, these problems and disadvantages of prior known mobile telephone locating systems are overcome by providing selected mobile telephones with an emergency radio beacon transmitter for selectively broadcasting an emergency radio beacon to enable tracking of the remote telephone by means of distress beacon signal strength detection.

In the preferred embodiment of the mobile telephone system of the present invention, the mobile telephone has an emergency radio beacon transmitter and means responsive to receipt of an emergency beacon activation signal for automatically activating the emergency radio beacon transmitting means, and the communication system includes an emergency center from which emergency beacon actuation signal to the mobile telephone which placed the call if an indication is received the emergency center that the mobile telephone placing the emergency call has emergency radio beacon transmitting capability.

Advantageously, the architecture of existing mobile telephone communication systems need not be altered to incorporate the invention. A MSC/VLR switch indicates to the beacon activating emergency center that an incoming call is coming from a mobile telephone that is emergency beacon capable by connecting the call to the emergency center via a trunk line dedicated to emergency calls from only emergency beacon capable telephones. Alternatively, if it is not desired or practical to have a dedicated trunk, the mobile switch, preferably a MSC/VLR switch is programmed to add a special prefix or suffix to the calling party's number or to add a suffix to the emergency center's number before being conveyed to the emergency center which prefix or suffix indicates to the emergency center that the incoming emergency call is from an emergency beacon capable mobile telephone. The emergency beacon actuation signal is likewise incorporated into the existing signaling system available by the use of an Unstructured Supplementary Services Data (USSD) signal, short message signal, or control signal on an interface, preferably a GSM Direct Transfer Application Part (DTAP) interface based on the GMS specification 04.08.

Advantageously, because the activation of the emergency beacon is performed remotely and is selectively based on emergency information concurrently being received from the caller, the inadvertent activation of the emergency beacon by the caller is eliminated entirely and inadvertent activation by the emergency center is unlikely.

These and other features and advantages of the present invention are made apparent from the following detailed description, the accompanying drawings and the appended claims.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of a preferred embodiment of the emergency radio beacon capable mobile telephone communication system of the present invention;

FIG. 2 is a detailed functional block diagram of the preferred embodiment of the emergency beacon capable mobile telephone of the present invention shown as only a single functional block in FIG. 1;

FIG. 3 is a detailed functional block diagram of the beacon activating emergency center shown as only a single block as FIG. 1;

FIGS. 4A and 4B form a composite flow chart of the preferred method of operating the system of FIG. 1 in accordance with the invention;

DETAILED DESCRIPTION

Figure 5:
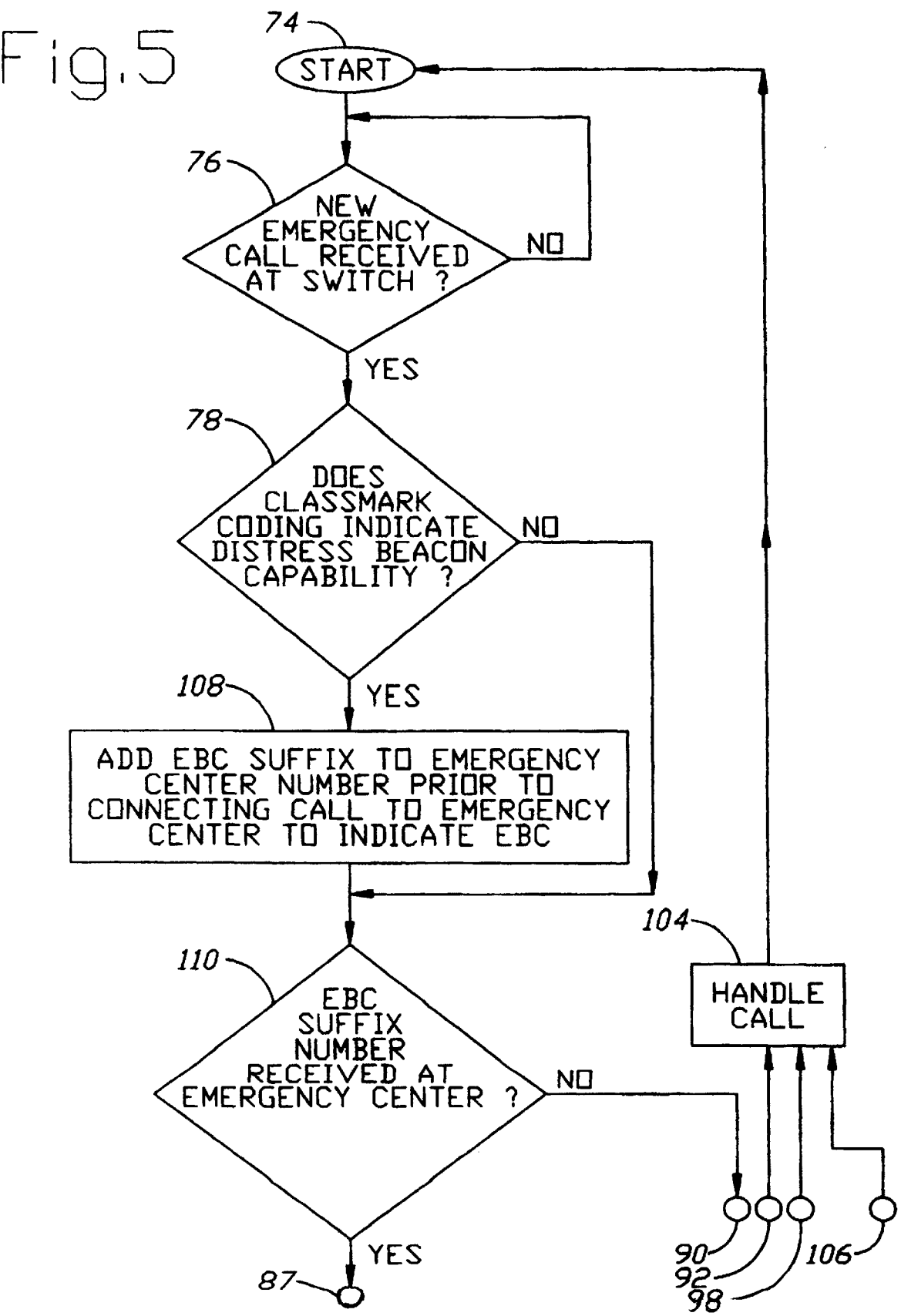
FIG. 5 is a part of a flow chart of an alternative method operating the system of FIG. 1 which forms a composite flow chart combined with that of FIG. 4B in lieu of FIG. 4A.

Referring to FIG. 1, the preferred embodiment of the emergency beacon capable mobile telephone system 10 is seen to include a plurality of emergency beacon capable mobile telephones, such as emergency beacon capable mobile telephone 24 and, optionally, a plurality of regular mobile telephones, such as regular module telephone 26, which are not emergency radio beacon capable. In a land based system, the emergency beacon capable mobile telephone, or beacon capable telephone, 24 transmits emergency calls on a radio wave 28 directly to a base radio transceiver 30 while the regular mobile telephone 26 transmits emergency calls directly to the base radio transceiver on a radio wave 32. Alternatively, in a satellite based mobile communication system, the beacon capable telephone 24 transmits emergency calls via a radio wave 34 to a communication satellite 36 which relays the call to the base radio transceiver 30 via a radio wave 38. Likewise, the communications of the regular mobile telephone 26 with the base radio transceiver 30 is via radio waves (not shown) between the regular mobile telephone 26 and the communication satellite 36 which relays the communication to the base radio transceiver 30 on radio wave 38. All communications are two way full duplex.

In either case, satellite based or not, the emergency calls as well as other calls from both beacon capable telephones 24 and regular mobile telephones 26 received at the base radio transceiver 30 are coupled via a land line 34 to an MSC/VLR switch 40 which is a mobile switching center with a visitor location register. The MSC/VLR switch 40 connects the emergency calls received via the base radio transceiver 30 to an emergency center 42 on trunk lines 44 and 46.

The MSC/VLR switch 40 manages the calls and is responsible for setting up, routing, controlling and terminating the calls, managing the charges accrued, managing hand-off, and providing supplementary services. The VLR (visitor location register) portion of the MSL/VLR switch 40 has a data base containing temporary information about all the mobile stations located in the area serviced by one MSC/VLR switch 40. Thus, each MSC/VLR switch 40 must have its own VLR. The MSC/VLR switch 40 combines the MSC and VLR into one node AXE is an architectural framework for a communication system that defines a wide range of communication platforms in public fixed and mobile networks. The AXE system specifies a set of functional blocks that are combined to form subsystems which, in turn, are combined into a switching system called APT with a control system called APZ. An AXE exchange, called system level one, is a combination of APT and APZ subsystems, each of which are at system level two. The APT switching system is a telephonic switch responsible for traffic handling, associated operation and maintenance, and charging. The control system APZ is responsible for operating system functions, input-output functions.

The second system level is divided further into a number of subsystems. These subsystems support the telephonic services and operations such as mobile telephone subsystems (MTS) and link handling subsystems (LHS) and the control systems. A given subsystem is further subdivided into functional blocks. For example, clock distribution is a function that requires its own data and its own signal interworking capability. Several functional blocks interface with each other to send messages amongst themselves.

Referring to FIG. 2, the beacon capable mobile telephone 24 is controlled by a microprocessor 50 which receives local inputs form a keypad 52 and remote inputs from a radio transceiver 54 coupled to the antenna 25. The microprocessor 50 also receives local voice input from a microphone 56 and reproduces received information voice on a local speaker 58. A display 48 shows inputs to and outputs from the microprocessor 50. In accordance with the invention, the beacon capable telephone 24 has an emergency radio beacon signal generator 60 which is controlled by the microprocessor 50 to generate an emergency radio beacon via radio transceiver 54 and antenna 25. The microprocessor enables generation and transmission of the emergency radio beacon by the generator 60 and transceiver 54 in response to receipt of a coded emergency beacon activation signal sent from the base radio transceiver 30 selectively in response to control signals from the beacon activation emergency center 42. Alternatively, the microprocessor has a built in capacity to generate the activation signal which is applied directly to the radio transmitter 54. The emergency radio beacon signal generator 60, once actuated, continues to operate and generates a radio beacon at a frequency on the order of the frequencies already used, e.g. 121.5 Mhz, 243 Mhz or 406.5 Mhz bands until selectively terminated at the beacon activating emergency center.

Stand alone tone generators and computers with built in tone generating capability are well known and the details of the emergency signal generator 60 forms no part of the invention. Likewise, the details of the other elements of the beacon capable telephone 24 are well known and form no part of the invention and preferably are the same components as those contained in a Model GF788 mobile telephone made by Ericsson Inc.

Referring to FIG. 3, the beacon activating emergency center 42 has a switch interface 62 for coupling signals between the trunk lines 44 and 46 and a microprocessor 64 with distress beacon functions. The microprocessor 64 also receives inputs from a keyboard 68 and provides visual output information to a display 66. As will be explained in detail below, the microprocessor 64 determines whether an emergency call is from a beacon capable telephone 24 and shows this on the display console 66 along with other relevant information. The emergency operator communicates with the caller via a speaker 70 and microphone 72 and makes entries for storage and display via the keyboard 68. In addition, if appropriate, the operator by means of commands entered on the keyboard 68, selectively activates the distress beacon microprocessor 64 to control the base radio receiver 30 to transmit a coded emergency beacon activation signal to the emergency beacon capable mobile telephone 24. Upon receipt of the correctly coded emergency beacon activation signal by the microprocessor 50, the emergency radio beacon signal generator 60, FIG. 2, of the emergency beacon capable mobile telephone 24 is activated to transmit the emergency radio beacon signal via radio transceiver 54 and antenna 25.

Preferably, the beacon activating emergency center 42, FIG. 1, handles only emergency calls within the mobile telephone communication system 10. Alternatively, the beacon activating emergency center 42 is merely part of a regular switching system which handles both emergency calls and non-emergency calls. In either case, in the preferred embodiment of the beacon activating emergency center 42, one or more of the trunks 46 and 48, such as trunk 46, is dedicated to calls received from emergency beacon capable telephones 24 such that receipt of a call on a emergency beacon capable dedicated trunk 46 indicates automatically to the beacon activating emergency center 42 that the call is coming from a emergency beacon capable mobile telephone 24. The MSC/VLR selects the dedicated trunk 46 to pass incoming calls to the beacon activating emergency center 42 in accordance with a preselected identification code in the signal transmitted from the emergency beacon capable telephone 24 which designates the presence of radio beacon transmission capability. Preferably, the identification code is one of a number in a set of pseudo a-numbers and a set of pseudo b-numbers associated with a preselected classmark.

A classmark provides the network with information concerning aspects of high priority of the mobile station equipment. The classmark is a digit or series of digits appended to the called number transmitted by the mobile telephone which informs the MSC/VLR 40 that the mobile telephone 24 is emergency radio beacon transmitter equipped. Preferably, the mobile telephone classmark of the present invention is a type 3 IE with two octets of length. Alternatively, the classmark is a mobile station classmark to 2 IE which provides the network with information concerning aspects of both high and low priority of the mobile telephone. An example of the classmark-2 to IE is a type 4 IE with five octets of length maximum.

In lieu of the classmark designation, alternatively the mobile telephone 24 with emergency beacon capability has an equipment serial number indicating that the mobile telephone 24 has emergency radio beacon transmitting capability. Alternatively, a special suffix is added to the regular number to indicate emergency beacon capability.

The emergency radio beacon activation signal is one of an unstructured supplementary services data signal, a short message service signal, or A-interface signal. The activation signal is transmitted from the base radio transceiver 30 in response to signals from the beacon activating emergency center 42 coupled through the MSC/VLR switch 40 depending upon which of the signaling systems is available in the communication system 10. The interface signals preferably comprise GMS specifications 04.04, 04.07 and 08.08.

The unstructured supplementary service data, or USSD, signaling system allows the mobile telephone user and the operator defined application to communicate in a way which is transparent to the mobile station and to intermediate network entities. The signaling is carried out independently of the application. In the mobile telephone the signaling is handled via a man-machine interface which is described in GMS standard 02.30 entitled "European Digital Cellular Telecommunication System (phase 2): Man-Machine Interface (MMI) of the Mobile Station (MS)" published by ETSI Telecommunications Standards Institute, published March, 1997, the disclosure of which is hereby incorporated by reference. The MSC/VLR switch 40 is capable of sending a USSD signal towards the mobile telephones which is either a request asking the mobile telephone to provide information or a notification that requires no response by the mobile telephone. All USSD requests, response to request and notifications contain the USSD 60-string, an alphabet indicator and a language indicator, as defined in the GMS standard 02.04 which is hereby incorporated by reference.

A short message service, or SMS, signal has text messages of limited size, usually up to 160 alphanumeric characters sent to and received from mobile stations, and the operation of short message service is described under the global standards for mobile communication, or GSM standards, as described in GSMO3-40 version 5.5.0 published by ETSI, European Telecommunication Standards Institute, published March, 1997, the disclosure of which is hereby incorporated by reference. Briefly, the SMS comprises two basic services: mobile terminated service from a SMS service center to the mobile station and mobile originated service from a mobile station 61 to a SMS service center. In mobile originated SMS transactions, the systems will transfer a short message submitted by the mobile station to a SMS service center. It will also provide information about the delivery of the short message either by a delivery report or a failure report. An interworking message service center is also capable of receiving a short message from within the public land mobile network, or PLMN, and submitting it to a recipient service center. GSM based MSC's and interworking MSC's are found in MSC/VLR nodes.

Referring now to FIGS. 4a and 4b, in the preferred embodiment of the invention, after initiation of the process in the start step 74, in step 76 a determination is made as to whether a new emergency call has been received at the MSS/VLR switch 40. After receipt of the emergency call, in step 78 a determination is made as to whether the classmark coding received indicates that the mobile telephone making the emergency call is distress beacon capable. If the classmark indicates the call is from the emergency beacon capable telephone 24, then in step 80 the call is connected to the beacon activating emergency center 42, FIG. 1, via one of the trunks, such as trunk 46, which has been dedicated to receipt of calls from only emergency beacon capable telephones 24. If the classmark does not indicate emergency beacon capability, then in step 82, calls are connected via the trunk 46 associated only with emergency calls from regular telephones 26, to the emergency center 42, and in step 84, the call is handled in a conventional fashion.

In step 84 the beacon activating emergency 42 determines whether the call is received on the emergency beacon capable dedicated trunk 46.

Turning to FIG. 4b, in step 86 the fact of emergency beacon capability is indicated on the display counsel 66 via junction 87. If not, the lack of emergency beacon capability is displayed in step 88 which is reached via junction 90, and the operator then handles the call accordingly in step 84 reached via junction 92.

In the event that there is a display of emergency beacon capability, in step 86, a determination is made by the operator as to whether activation of the caller's emergency beacon is required. If it is required, in step 90 the operator manually selects from keyboard 68 the emergency beacon activation signal transmitting function in step 94, and the emergency beacon activation signal is transmitted in step 96 via the microprocessor 64 and switch interface 62 of FIG. 3 and the MSC/VLR switch 40 and base radio transceiver 30 of FIG. 1. If no emergency radio beacon is required, the operator does not select activation, and the program returns to step 93, FIG. 4a, via junction 98.

At the emergency beacon capable telephone 24, in step 100 a determination is made as to whether an emergency beacon activation signal has been received for that telephone 24. If the activation signal is received, in step 102, the emergency beacon capable telephone 24 transmits the emergency radio beacon and then the program returns to step 93 via junction 106 and the call continues to be handled by the operator.

Referring now to FIG. 5, the process employed in alternative embodiment of the communication system 10 is shown which forms a composite flowchart with FIG. 4b the flowchart of FIG. 5 has the same steps as the flowchart of FIG. 4a, except steps 80 and 84 are replaced by steps 108 and 110, respectively, to eliminate the need for the emergency beacon capable dedicated trunk required in the method of FIG. 4a and as otherwise described above. Referring still to FIG. 5, in step 108 if the classmark coding indicates the emergency beacon capability, in step 78 an emergency beacon capable indicating suffix is added to the emergency center number by the MSC/VLR switch 40 prior to communication with the emergency center. At the emergency center 42, if the call has an emergency beacon capable indicating suffix number, then the process continues to step 86, FIG. 4b via junction 87. If not, then the next step is step 88, FIG. 4b reached via junction 90. If the classmark coding does not indicate the distress beacon capability in step 78, the next step performed is step 110 and consequently step 88, FIG. 4b.

Figure 6:
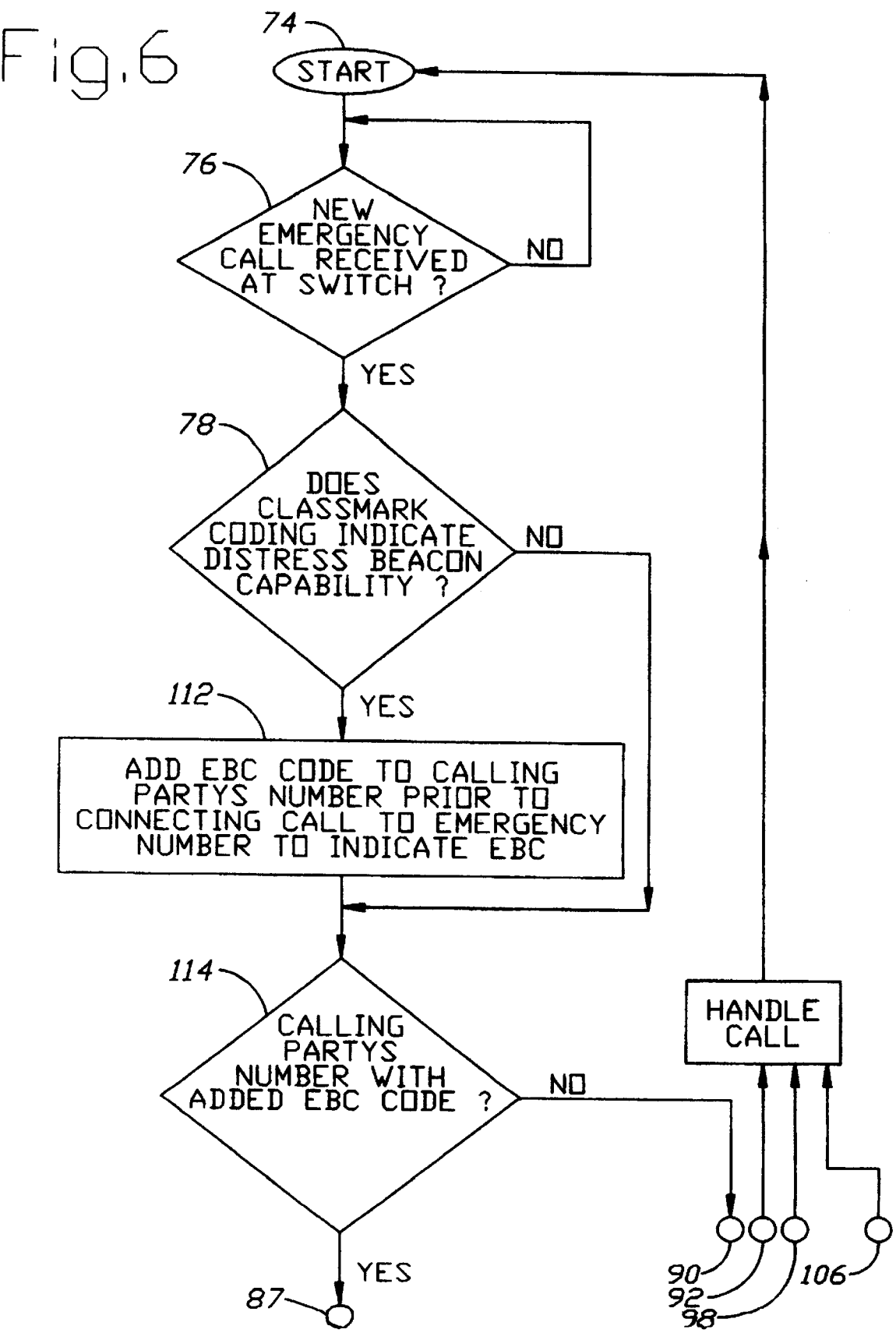
FIG. 6 is part of a flow chart of yet another alternative method of operating the system of FIG. 1 which forms a composite flow chart when combined with that of FIG. 4B in lieu of FIG. 4A.

Referring to FIG. 6, another method for the emergency center 42 to determine whether an incoming emergency call is from an emergency beacon capable telephone 24 without the need for a dedicated trunk is shown. Again, the flowchart of FIG. 6 is used in lieu of the flowchart of FIG. 4a and combines with that of FIG. 4b. In the flowchart of FIG. 6, the steps 80 and 84 of FIG. 4a have been replaced by steps 112 and 114 of FIG. 6. In step 112, if the classmark coding indicates the beacon capability, in step 78, an emergency beacon capability indicating code, a prefix or a suffix, is added to the calling party's number prior to connecting that call to the emergency center. At the emergency center, in step 114, if the calling party's number has an added emergency beacon capable indicating code, then the program continues to step 86, FIG. 4b via junction 87. If not, the program proceeds to step 88 via junction 90 and the process continues as described above with respect to FIG. 4b.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting the present invention. Rather, it is intended that the invention cover all modifications, equivalents and alternatives falling within the scope of the invention as defined by the appended claims.

What is claimed is:

1. A mobile telephone, comprising:
   means for transmitting an emergency radio beacon;
   means for placing an emergency call, and in combination with
   a mobile telephone communication system including means for transmitting an emergency beacon activation signal;
   means for indicating to said emergency beacon activation signal transmitting means presence of emergency radio beacon transmitting capability;
   at least one dedicated trunk associated with the emergency beacon activation signal transmitting means to handle emergency calls from only mobile telephones having emergency radio beacon transmitting capability; and
   means responsive to receipt of the emergency beacon activation signal for actuating the emergency radio beacon transmitting means.

2. The mobile telephone of claim 1 in which said emergency beacon activation signal transmitting means is associated with an emergency center switching system dedicated to handling only emergency calls within the mobile telephone communication system.

3. The mobile telephone of claim 1 in which said emergency beacon activation signal transmitting means is associated with a nondedicated regular switch of the mobile telephone communication system with an operator interface for handling both the emergency calls and nonemergency calls.

4. The mobile telephone of claim 3 in which said nondedicated regular switch is a mobile switch center with a visitor location register.

5. The mobile telephone of claim 1 in which
   said mobile telephone communication system includes means for selecting said at least one dedicated trunk for handling the emergency call in accordance with a preselected classmark, and
   said transmitting means includes means for transmitting a signal to said trunk selecting means with said preselected classmark for designating radio beacon transmission capability.

6. The mobile telephone of claim 1 in which said emergency beacon transmitting capacity indicating means includes means for providing a preselected identification code associated with emergency beacon transmitting capability to the activation signal transmitting means.

7. The mobile telephone of claim 6 in which said preselected identification code is a selected from one of a set of pseudo a-numbers and a set of pseudo b-numbers.

8. The mobile telephone of claim 6 in which said preselected identification code includes an equipment serial number.

9. The mobile telephone of claim 1 in which said emergency beacon activation signal is transmitted as an unstructured supplementary services data signal.

10. The mobile telephone of claim 1 in which said emergency beacon activation signal is transmitted as a short message service signal.

11. The mobile telephone of claim 1 in which said emergency beacon activation signal is transmitted as a controlled A-interface signal.

12. The mobile telephone of claim 1 integrated with a cellular telephone system.

13. The mobile telephone of claim 1 integrated with a satellite telephone system.

14. The mobile telephone of claim 1 including means for transmitting a signal indicating presence of the emergency radio beacon transmitting capability prior to receipt of the activation signal.

15. A mobile telephone communication system, comprising:
   a plurality of mobile telephones at least one of which has an emergency radio beacon transmitting capability;
   means for remotely controlling the mobile telephones to selectively transmit an emergency radio beacon;
   an emergency center with a number associated with only emergency beacon capable mobile telephones and a regular emergency number associated with other mobile telephones; and
   means for connecting an emergency call to the special emergency center number associated with mobile telephones having emergency radio beacon capability only from the at least one mobile telephone unit having emergency radio beacon capability.

16. The mobile telephone communication system of claim 15 in which said emergency center includes
   means responsive to receipt of an emergency call placed to said special emergency number to indicate the emergency call is from a mobile telephone having emergency radio beacon transmitting capability, and
   means for selectively transmitting an emergency beacon activation signal to the mobile telephone which placed the emergency call to the special emergency center number.

17. The mobile telephone communication system of claim 16 in which said emergency radio beacon activation signal is an unstructured supplementary service data signal.

18. The mobile telephone communication system of claim 16 in which said signal is a short message service signal.

19. The mobile telephone communication system of claim 16 in which said data signal is a controlled A-interface signal.

20. The mobile telephone communication system of claim 16 in which said emergency beacon activation signal transmitting means includes means for manually selectively transmitting the emergency beacon activation signal.

21. The mobile telephone communication system of claim 16 in which said emergency center has at least one trunk line dedicated for receipt of calls only from emergency beacon capable mobile telephones.

22. The mobile telephone communication system of claim 15 in which the at least one of the mobile telephones has a special modified number indicating that the mobile telephone has the emergency radio beacon transmitting capability.

23. The mobile telephone communication system of claim 22 in which the at least one mobile telephone has a regular number and said special modified number is the regular number combined with one of a special prefix added to the regular number and a special suffix added to the regular number.

24. A method of establishing transmission of an emergency radio beacon comprising the steps of:
   selectively transmitting an emergency beacon activation signal to a remote mobile telephone;
   determining whether the remote telephone that placed the emergency call is capable of responding to an emergency beacon activation code with transmission of an emergency beacon;
   only transmitting an emergency beacon activation code if it is determined that the remote telephone is capable of responding to an activation signal with transmission of the emergency radio beacon; and
   activating an emergency radio beacon transmitting means at the remote mobile telephone to transmit the emergency radio beacon in response to receipt of said emergency beacon activation signal.

25. The method of claim 24 in which said step of selectively transmitting an emergency beacon activation signal includes the steps of
   first receiving an emergency call placed from the remote mobile telephone, and
   then, in response to information obtained from a caller of the emergency call placed from the remote mobile telephone, selectively transmitting the emergency beacon activation signal to the remote mobile telephone.

26. The method of claim 25 in which said step of selectively transmitting an emergency beacon activation signal includes the step of selectively broadcasting an activation signal encoded with an individual code for responsive activation of the emergency radio beacon transmitting means of only one mobile telephone unit associated with said individual code.

* * * * *